(12) United States Patent
Leininger et al.

(10) Patent No.: US 7,956,027 B2
(45) Date of Patent: Jun. 7, 2011

(54) COATED SODIUM PERCARBONATE PARTICLES

(75) Inventors: Stefan Leininger, Langenselbold (DE); Harald Jakob, Hasselroth (DE); Ralph Overdick, Hofheim (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/320,394

(22) PCT Filed: Jul. 4, 2007

(86) PCT No.: PCT/EP2007/056739
§ 371 (c)(1),
(2), (4) Date: Jan. 26, 2009

(87) PCT Pub. No.: WO2008/012181
PCT Pub. Date: Jan. 31, 2008

(65) Prior Publication Data
US 2009/0137448 A1    May 28, 2009

(30) Foreign Application Priority Data

Jul. 27, 2006    (EP) .................................... 06117986

(51) Int. Cl.
*C11D 3/395*    (2006.01)
(52) U.S. Cl. ...................... 510/529; 510/357; 252/186.2
(58) Field of Classification Search .................. 510/529, 510/357; 252/186, 186.2
See application file for complete search history.

(56) References Cited

U.S. PATENT DOCUMENTS

| | | |
|---|---|---|
| 4,146,571 A | 3/1979 | Will et al. |
| 4,156,039 A | 5/1979 | Klebe et al. |
| 4,325,933 A | 4/1982 | Matsumoto et al. |
| 4,329,244 A | 5/1982 | Brichard et al. |
| 4,428,914 A | 1/1984 | Brichard et al. |
| 4,526,698 A | 7/1985 | Kuroda et al. |
| 5,332,518 A | 7/1994 | Kuroda et al. |
| 5,462,804 A * | 10/1995 | Kokubu et al. ............ 428/402.24 |
| 5,560,896 A | 10/1996 | Bewersdorf et al. |
| 5,935,708 A | 8/1999 | Schuette et al. |
| 6,022,404 A | 2/2000 | Ettlinger et al. |
| 6,113,805 A * | 9/2000 | Schutte et al. ............. 252/186.2 |
| 6,159,252 A | 12/2000 | Schutte et al. |
| 6,165,963 A | 12/2000 | Delroisse et al. |
| 6,239,095 B1 | 5/2001 | Bertsch-Frank et al. |
| 6,245,115 B1 | 6/2001 | Appel et al. |
| 6,465,408 B1 | 10/2002 | Lee et al. |
| 6,583,098 B1 * | 6/2003 | Cassie ........................... 510/376 |
| 6,800,775 B1 | 10/2004 | Bachmann et al. |
| 6,900,169 B2 * | 5/2005 | Wasserman et al. .......... 510/441 |
| 2002/0041843 A1 | 4/2002 | Jakob et al. |
| 2002/0086807 A1 * | 7/2002 | Lee et al. ....................... 510/309 |
| 2003/0104967 A1 | 6/2003 | Jakob et al. |
| 2006/0014658 A1 * | 1/2006 | Zimmermann et al. ....... 510/375 |
| 2006/0063693 A1 * | 3/2006 | Jakob et al. .................... 510/445 |
| 2006/0148669 A1 * | 7/2006 | Ulrike Kottke et al. ....... 510/367 |
| 2006/0148670 A1 * | 7/2006 | Rabe et al. ..................... 510/375 |
| 2006/0249707 A1 * | 11/2006 | Zimmermann et al. . 252/186.27 |
| 2007/0135323 A1 | 6/2007 | Wiedemann et al. |
| 2007/0275243 A1 | 11/2007 | Sontgerath et al. |
| 2008/0108538 A1 | 5/2008 | Sontgerath et al. |
| 2008/0274937 A1 | 11/2008 | Venbrux et al. |

FOREIGN PATENT DOCUMENTS

| | | |
|---|---|---|
| AU | B-31754/95 | 4/1996 |
| CA | 2170599 A1 | 3/1995 |
| DE | 2 417 572 | 11/1974 |
| DE | 26 22 610 | 12/1976 |
| DE | 27 44 574 A1 | 4/1978 |
| DE | 27 12 139 | 9/1978 |
| DE | 195 44 293 A1 | 6/1997 |
| DE | 103 20 196 A1 | 7/2004 |
| EP | 0 651 053 A1 | 5/1993 |
| EP | 0 544 490 A1 | 6/1993 |
| EP | 0 567 140 A1 | 10/1993 |
| EP | 0 703 190 A1 | 3/1996 |
| EP | 0 722 992 A1 | 7/1996 |
| EP | 0 787 682 A1 | 8/1997 |
| EP | 0 970 917 A1 | 1/2000 |
| EP | 1 149 800 A1 | 10/2001 |
| EP | 1 612 185 A1 | 1/2006 |
| EP | 1 612 186 A1 | 1/2006 |
| EP | 1 728 762 A1 | 12/2006 |
| GB | 1 466 799 | 3/1977 |
| GB | 1 538 893 | 1/1979 |
| GB | 2 123 044 A | 1/1984 |
| GB | 2 309 976 A | 8/1997 |
| WO | WO 95/06615 | 3/1995 |
| WO | WO 95/15292 | 6/1995 |

(Continued)

OTHER PUBLICATIONS

Crystallization of sodium sulfate phases in porous materials: The phase diagram Na2SO4-H2O and the generation of stress. Michael Steiger, Sonke Asmussen, Geochimica et Cosmochimica Acta 72 (2008) 4291-4306.*

(Continued)

*Primary Examiner* — Milton I Cano
*Assistant Examiner* — M. Reza Asdjodi
(74) *Attorney, Agent, or Firm* — Law Office of: Michael A. Sanzo, LLC

(57) ABSTRACT

Sodium percarbonate particles with a coating layer comprising sodium sulfate in the form of a high-temperature phase of sodium sulfate and/or of a high-temperature phase of a double salt of composition $Na_4(SO_4)_{1+n}(CO_3)_{1-n}$ where n is from 0 to 0.5 have an improved storage stability in detergent and cleaning composition formulations as compared with sodium percarbonate particles which comprise sodium sulfate in the coating layer only in the form of sodium sulfate (V) or burkeite.

19 Claims, No Drawings

FOREIGN PATENT DOCUMENTS

| | | |
|---|---|---|
| WO | WO 97/19890 | 6/1997 |
| WO | WO 99/64156 | 12/1999 |
| WO | WO 00/12808 | 3/2000 |
| WO | WO 00/27975 | 5/2000 |
| WO | WO 00/52124 | 9/2000 |
| WO | WO 00/60043 | 10/2000 |
| WO | WO 01/05925 A1 | 1/2001 |
| WO | WO 03/031045 A1 | 4/2003 |
| WO | WO 2004/039932 A1 | 5/2004 |
| WO | WO 2004/056954 A1 | 7/2004 |
| WO | WO 2004/058640 A1 | 7/2004 |
| WO | WO 2006/003155 | 1/2006 |

OTHER PUBLICATIONS

The Hexagonal Burkeite Solid Solution in the Na2SO4-Na2CO3 System. A.N. Khalpova and E.S. Kovaleva N. S. Kurnakov General and Inorganic Chemistry Institute, Academy of Science, USSR. Translated from Zhurnal Struturnoi Khimi, vol. 4, No. 4, pp. 569-575, Jul.-Aug. 1963.*

English translation of the International Preliminary Report on Patentability for PCT/2007/056739 filed Jul. 4, 2007.

Reinhardt, et al., "Neue reaktive Bleichaktivatoren-eine Gratwanderung zwischen Bleicheffizienz and Farb-/Faserschädigung," *Tenside Surf. Det.* 34(6): 404-409 (1997).

International Search Report for PCT/EP2007/056739 filed Jul. 4, 2007.

Written Opinion of the International Searching Authority for PCT/2007/056739 filed Jul. 4, 2007.

International Preliminary Report on Patentability for PCT/2007/056739 filed Jul. 4, 2007.

Cole, et al., "Characterization of the Sodium Sulfate-Sodium Phosphate System," *J. Mol. Struct.* 643:101-107 (2002).

Eysel, et al., "Crystal Chemistry and Structure of $Na_2SO_4(I)$ and Its Solid Solutions," *Acta. Cryst.* B41:5-11 (1985).

Singhvi, et al., "Effect of Aliovalent Cation Doping on the Electrical Conductivity of $Na_2SO_4$: Role of Charge and Size of the Dopant," J. Solid State Chem. 138: 183-192 (1998).

English language abstract for EP 0 703 190 A1, Mar. 27, 1996.
English language abstract for WO 95/06615, Mar. 9, 1995.
English language abstract for WO 03/031045 A1, Apr. 17, 2003.
Response to Office Action filed on Sep. 8, 2010 for copending U.S. Appl. No. 12/310,817.
Response to Office Action filed Oct. 18, 2010 for copending U.S. Appl. No. 12/320,393.
Notice of Opposition filed for EP 1903098 on Jul. 15, 2009.
Translation of arguments made in Notice of Opposition filed for EP1903098, Mar. 26, 2008.
Reply of patent proprietor to Opposition, filed Jan. 7, 2010.
Translation of Reply of patent proprietor to Opposition, filed Jan. 7, 2010.
Linnow, et al., "Investigation of Sodium Sulfate Transitions in a Porous Material Using Humidity- and Temperature-Controlled X-ray Diffraction," *Anal. Chem.* 78:4683-4689 (2006).
Sakaguchi, et al., "The Phase-Transition Phenomenon in a Sodium Sulfate Crystal," *J. Electrochem. Soc. 131*:1942-1943 (1984).
EP 1903098 (grant of application EP 06117986.7, filed Jul. 27, 2006).
Extended European Search Report for EP 06117986.7, Jul. 27, 2006.
Translation of text from Extended European Search report for EP 06117986.7, Jul. 27, 2006.
Amendments prior to Examination filed by applicants in EP 06117986.7 on Mar. 22, 2007.
Translation of Amendments prior to Examination filed by applicants in EP 06117986.7 on Mar. 22, 2007.
Cole, et al., "Characterization of the Sodium-Sulfate-Sodium Phosphate System," *J. Mol. Struct.* 643:101-107 (2002).
Claims in EP 06117986.7, as filed Jul. 27, 2006.
Translation of Claims in EP 06117986.7, as filed Jul. 27, 2006.
Office Action mailed Jul. 19, 2010 for U.S. Appl. No. 12/320,393.
Preliminary Amendment filed for U.S. Appl. No. 12/320,393 on Jan. 26, 2009.
Office Action mailed Jun. 8, 2010 for U.S. Appl. No. 12/310,817.
Preliminary Amendment filed for U.S. Appl. No. 12/310,817. on Mar. 9, 2009.
Preliminary Amendment filed for U.S. Appl. No. 12/442,865, on Mar. 25, 2009.
Preliminary Amendment filed for U.S. Appl. No. 12/747,918, on Jun. 13, 2010.
English language abstract for DE 27 12 139, Sep. 2, 1978.
English language abstract for EP 0 787 682, Aug. 6, 1997.
Office Action dated Oct. 27, 2010 for copending U.S. Appl. No. 12/310,817.
Office Action dated Nov. 17, 2010 for copending U.S. Appl. No. 12/320,393.
Response to Office Action dated Oct. 27, 2010 for copending U.S. Appl. No. 12/310,817, (Response filed on Jan. 25, 2011).
Response to Office Action dated Nov. 17, 2010 for copending U.S. Appl. No. 12/320,393, (Response filed on Feb. 4, 2011).
Advisory Action dated Feb. 10, 2011 for copending U.S. Appl. No. 12/310,817.
Office Action dated Mar. 2, 2011 for copending U.S. Appl. No. 12/320,393.
Notice of Appeal filed on Feb. 27, 2011 for copending U.S. Appl. No. 12/310,817.
Appeal Brief filed on Apr. 21, 2011 for copending U.S. Appl. No. 12/310,817.

* cited by examiner

COATED SODIUM PERCARBONATE PARTICLES

CROSS REFERENCE TO RELATED APPLICATIONS

The present application is U.S. national stage of international application PCT/EP2007/056739, which had an international filing date of Jul. 4, 2007, and which was published in German under PCT Article 21(2) on Jan. 31, 2008. The international application claims priority to European application EP 06117986.7, filed on Jul. 27, 2006. These prior applications are hereby incorporated by reference in their entirety.

The invention provides coated sodium percarbonate particles with high storage stability in detergents and cleaning compositions.

Sodium percarbonate is increasingly being used as a bleaching constituent in detergents and cleaning compositions. For this application, sodium percarbonate must have sufficient storage stability in detergent and cleaning composition formulations, since there is otherwise undesired loss of active oxygen and hence of bleaching action in the course of storage of the detergents and cleaning compositions. Sodium percarbonate is moisture-sensitive and decomposes in detergent and cleaning composition formulations under the action of moisture with loss of active oxygen. To produce detergents or cleaning compositions, sodium percarbonate is therefore typically used in coated form, the coating layers preventing the action of moisture on the coated sodium percarbonate particles. Suitable coating layer of inorganic hydrate-forming salts, for example sodium carbonate, sodium sulfate or magnesium sulfate and mixtures of such salts, are known, for example, from DE 24 17 572, EP-A 0 863 842 and U.S. Pat. No. 4,325,933. However, there is still a need for coating layers having improved stabilizing effect.

It has now been found that, surprisingly, a coating layer which comprises sodium sulfate in the form of a high-temperature phase of sodium sulfate and/or of a high-temperature phase of a double salt of sodium sulfate and sodium carbonate allows the storage stability of sodium percarbonate in detergents to be improved as compared with sodium percarbonate which comprises sodium sulfate in the form of thenardite or burkeite in the coating layer.

The invention therefore provides sodium percarbonate particles with a coating layer, wherein the coating layer comprises sodium sulfate in the form of a high-temperature phase of sodium sulfate and/or of a high-temperature phase of a double salt of composition $Na_4(SO_4)_{1+n}(CO_3)_{1-n}$ where n is from 0 to 0.5.

Five solid-state phases (I) to (V) of anhydrous sodium sulfate are known, which can be distinguished by powder X-ray diffractometry with reference to their characteristic diffractograms. At temperatures below 180° C., the sodium sulfate(V) phase, also known as thenardite, is thermodynamically stable. By cooling the high-temperature phase sodium sulfate(I) to temperatures below 237° C., the high-temperature phase sodium sulfate(III) is obtainable, which is metastable at 20° C. in the absence of moisture, whereas, in the presence of moisture or of sodium sulfate(V), there is a rapid conversion to the thermodynamically stable sodium sulfate (V) phase. The structures and diffractograms of these phases are known to those skilled in the art from the database of the International Center for Diffraction Data (ICDD), known under the data set numbers 00-037-1465 for sodium sulfate (V), 00-024-1132 for sodium sulfate(III) and 01-078-1883 for sodium sulfate(I).

Sodium sulfate forms mixed salts with sodium carbonate of the composition $Na_4(SO_4)_{1+n}(CO_3)_{1-n}$, where n is in the range from 0 to 0.5. At 20° C., these mixed salts are present in the thermodynamically stable burkeite structure. The diffractogram of burkeite is known to those skilled in the art for n=0.39 under ICDD data set number 01-085-1731. For burkeite, a hexagonal high-temperature phase isostructural to sodium sulfate(I) is known, whose diffractogram for n=0.33 is known under the ICDD data set number 00-024-1139.

The inventive sodium percarbonate particles comprise preferably sodium sulfate in the form of sodium sulfate(III) or in the form of the double salt with hexagonal crystal structure. If sodium sulfate(III) is present, the proportion of sodium sulfate(III) is preferably greater than the proportion of sodium sulfate(V). If the double salt with hexagonal crystal structure is present, the proportion of the hexagonal phase is preferably greater than the proportion of burkeite. Sodium sulfate(III) and the double salt with hexagonal crystal structure may also be present alongside one another.

The inventive sodium percarbonate particles comprise preferably more than 50% by weight of sodium sulfate in the coating layer, more preferably more than 70% by weight of sodium sulfate, calculated as anhydrous sodium sulfate.

The inventive sodium percarbonate particles preferably comprise a sodium borate in the coating layer. The proportion of sodium borate in the coating layer is then preferably from 0.5 to 20% by weight and more preferably from 1 to 10% by weight, calculated as sodium metaborate.

The proportion by weight of the coating layer, based on the mass of the sodium percarbonate particle, in the inventive sodium percarbonate particles is preferably from 1 to 15%, more preferably from 2 to 8% and especially from 2 to 6%.

The inventive coating layer which comprises sodium sulfate in the form of a high-temperature phase is preferably configured such that it covers the material below it to an extent of more than 95%, preferably to an extent of more than 98% and especially completely.

The inventive sodium percarbonate particles comprise a core which consists essentially of sodium carbonate perhydrate of composition $2\ Na_2CO_3.3H_2O_2$. They may additionally also comprise, in the core, small amounts of known stabilizers for peroxygen compounds, for example magnesium salts, silicates, phosphates and/or chelate complexing agents. The proportion of sodium percarbonate in the core of the inventive sodium percarbonate particles is preferably more than 80% by weight and more preferably more than 95% by weight. The proportion of organic carbon compounds in the core is preferably less than 1% by weight, more preferably less than 0.1% by weight.

In a preferred embodiment, the core comprises small amounts of additives which have a stabilizing effect on the active oxygen content, in which case the proportion of stabilizing additives in the core is preferably less than 2% by weight. The stability-increasing additives used are preferably magnesium salts, waterglass, stannates, pyrophosphates, polyphosphates, and chelate complexing agents from the group of the hydroxycarboxylic acids, aminocarboxylic acids, aminophosphonic acids, phosphonocarboxylic and hydroxyphosphonic acids, and the alkali metal, ammonium or magnesium salts thereof. In a particularly preferred embodiment, the core comprises, as a stabilizing additive, an alkali metal silicate, preferably waterglass with an $SiO_2/Na_2O$ modulus in the range from 1 to 3, in an amount of from 0.1 to 1% by weight. In the most preferred embodiment, the core, in addition to this amount of alkali metal silicate, also comprises a magnesium compound in an amount of from 50 to 2000 ppm of $Mg^{2+}$.

The core of the inventive sodium percarbonate particles can be obtained by one of the known preparation processes for sodium percarbonate. A suitable preparation process for sodium percarbonate is the crystallization of sodium percarbonate from aqueous solutions of hydrogen peroxide and sodium carbonate, the crystallization being performable either in the presence or in the absence of a salt precipitant, for which reference is made by way of example to EP-A 0 703 190 and DE 2 744 574. Sodium percarbonate particles prepared by the crystallization process in the presence of a salt precipitant may still comprise small amounts of the salt precipitant used, for example sodium chloride. Likewise suitable is fluidized bed buildup granulation by spraying of aqueous hydrogen peroxide solution and aqueous soda solution onto sodium percarbonate nuclei in a fluidized bed with simultaneous evaporation of water; reference is made by way of example to WO 95/06615. In addition, the reaction of solid sodium carbonate with an aqueous hydrogen peroxide solution and subsequent drying is another suitable preparation process.

In a preferred embodiment, the inventive sodium percarbonate particles have a core of sodium percarbonate which is obtainable by fluidized bed granulation from aqueous solutions of hydrogen peroxide and sodium carbonate. Such a fluidized bed granulation affords a core material which differs from the core materials obtained by other preparation processes by a particularly dense, shell-like structure and a smoother surface. Inventive coated sodium percarbonate particles whose core has been prepared by fluidized bed buildup granulation, as compared with particles whose core has been prepared by another process, exhibit improved storage stability in detergent and cleaning composition formulations.

In sodium percarbonate particles known from the prior art, whose coating layer has been prepared by spray application of solutions which comprise sodium sulfate or mixtures of sodium sulfate and sodium carbonate, the sodium sulfate is present in the coating layer in the form of the low-temperature phases sodium sulfate(V) (thenardite) or burkeite.

The inventive sodium percarbonate particles can be obtained by spray application of solutions which comprise sodium sulfate or mixtures of sodium sulfate and sodium carbonate, and a further cation or anion suitable for stabilizing a high-temperature phase as an additive. The high-temperature phases sodium sulfate(I) and sodium sulfate (III) can be stabilized by divalent and trivalent cations. Suitable cations are known from Acta Cryst. B41 (1985) 5-11 and J. Solid State Chem. 138 (1998) 183-192. The high-temperature phases can also be stabilized by suitable anions. A suitable anion is phosphate, known from J. Mol. Struct. 643 (2002) 101-107. Preference is given to stabilizing the high-temperature phase by the addition of a borate, more preferably by the addition of metaborate, especially of sodium metaborate. The addition of sodium metaborate allows sodium sulfate(III) and the hexagonal high-temperature phase of the sodium sulfate/sodium carbonate mixed salt to be stabilized.

During the spray application of the aqueous solution which comprises dissolved sodium sulfate and the additive which stabilizes the high-temperature phase, the majority of the water present therein, especially more than 90% of the water present in the aqueous solution, is preferably already evaporated as a result of supply of heat, such that only a small portion of the material below it is partly dissolved again during the spray application of the coating layer and a solid coating layer forms already during the spray application. The inventive coating layer is applied preferably by spraying an aqueous solution comprising sodium sulfate and the additive which stabilizes the high-temperature phase in a fluidized bed and more preferably by the process described in EP-A 0 970 917, with which it is possible to achieve a dense coating layer even with small amounts of coating layer material. The coating layer is applied in a fluidized bed preferably with supply of a drying gas to the fluidized bed, such that a temperature in the range from 30 to 90° C., preferably from 50 to 70° C., is established in the fluidized bed.

In addition to the inventive coating layer which comprises sodium sulfate in the form of a high-temperature phase, the inventive sodium percarbonate particles may also comprise one or more further coating layers, which may be disposed either between the core and the inventive coating layer or outside the inventive coating layer. The inventive coating layer is preferably present immediately on the core material of sodium percarbonate.

Between the coating layers and between the innermost coating layer and the core, there may exist a sharp boundary at which the composition changes abruptly. In general, however, there will be a transition zone in each case between the individual coating layers and between the innermost coating layer and the core, said transition zone comprising the components of both adjacent layers. Such transition zones form, for example, as a result of the application of a coating layer in the form of an aqueous solution, a portion of the layer below being partly dissolved at the start of the layer buildup, so as to form a transition zone which comprises the constituents of both layers. In the preferred embodiment, in which the inventive coating layer is present immediately on the core material of sodium percarbonate, a transition layer which comprises sodium sulfate in the form of the hexagonal sodium sulfate/sodium carbonate mixed salt of these components may thus form between the core and the inventive coating layer, even in the case of the spray application of a solution which does not comprise any sodium carbonate.

The inventive coated sodium percarbonate particles with a coating layer which comprises sodium sulfate in the form of a high-temperature phase surprisingly exhibit a better storage stability in detergent and cleaning composition formulations than coated sodium percarbonate particles which comprise sodium sulfate only in the form of sodium sulfate(V) or burkeite in the coating layer.

In the case of a content of at least 70% by weight of sodium sulfate in the outermost coating layer, the sodium percarbonate particles coated in accordance with the invention also exhibit no caking under the action of pressure and only a small release of heat in substance and can therefore be stored safely in a silo, without there being any caking in the silo or any self-heating of the silo contents.

In a further embodiment of the invention, the coated sodium percarbonate particles may have an additional coating layer which, as the main constituent, comprises an alkali metal silicate having an $SiO_2$ to alkali metal oxide modulus of more than 2.5. The additional coating layer is preferably present on top of the inventive coating layer. The additional coating layer comprises an alkali metal silicate as the main constituent when it does not comprise any further component in a proportion by weight greater than the proportion of alkali metal silicate. The modulus of the alkali metal silicate is preferably in the range from 3 to 5 and more preferably in the range from 3.2 to 4.2. The proportion of the additional coating layer in the inventive coated sodium percarbonate particles is preferably in the range from 0.2 to 3% by weight. The proportion of alkali metal silicate in the material of the additional coating layer is preferably more than 50% by weight and more preferably more than 80% by weight. The alkali metal silicate used in the additional coating layer is preferably sodium silicate and more preferably sodium waterglass.

Sodium percarbonate particles which have been coated in accordance with the invention and have an additional coating layer which comprises, as the main constituent, an alkali metal silicate having an $SiO_2$ to alkali metal oxide modulus of more than 2.5 additionally exhibit a retarded dissolution time in water and an improved storage stability in aqueous liquid or gel-form media at water contents of up to 15% by weight. They can therefore be used advantageously to produce liquid or gel-form detergent or cleaning composition formulations.

In a further embodiment of the invention, the coated sodium percarbonate particles may additionally have, on their surface, from 0.01 to 1% by weight, preferably from 0.1 to 0.5% by weight, of a fine oxide of the elements Si, Al or Ti, or of a mixed oxide of these elements. Suitable fine oxides are, for example, pyrogenic oxides which are obtained by flame hydrolysis of volatile compounds of the elements silicon, aluminum or titanium, or of mixtures of these compounds. The pyrogenic oxides or mixed oxides obtainable by this route preferably have a mean primary particle size of less than 50 nm and may be aggregated to larger particles whose mean particle size is preferably less than 20 μm. Likewise suitable are precipitated oxides which have been precipitated from aqueous solutions of compounds of the elements silicon, aluminum or titanium, or mixtures of these compounds. The precipitated oxides or mixed oxides may, as well as silicon, aluminum and/or titanium, also comprise small amounts of alkali metal or alkaline earth metal ions. The mean particle size of the precipitated oxides is preferably less than 50 μm and more preferably less than 20 μm. The specific BET surface area of the fine oxides is preferably in the range from 100 to 300 $m^2/g$.

The coated sodium percarbonate particles preferably have, on their surface, a hydrophobized fine oxide and more preferably a hydrophobized fumed or precipitated silica. Hydrophobized oxides in the context of the invention are oxides which have, on their surface, organic radicals bonded via chemical bonds and are not wetted by water. Hydrophobized oxides can be prepared, for example, by reacting pyrogenic or precipitated oxides with organosilanes, silazanes or polysiloxanes. Suitable silicon compounds for preparing hydrophobized oxides are known from EP-A 0 722 992, page 3 line 9 to page 6 line 6. Particular preference is given to hydrophobized oxides which have been prepared by reacting a fine oxide with a silicon compound of compound classes (a) to (e) and (k) to (m) listed in EP-A 0 722 992. The hydrophobized fine oxides preferably have a methanol wettability of at least 40.

Sodium percarbonate particles which have been coated in accordance with the invention and additionally have, on their surface, a fine oxide exhibit an even lower tendency to cake in the course of storage, in particular in the course of storage under pressure stress, and therefore have even better silo storability. Furthermore, such particles in detergent and cleaning composition formulations have a further increased storage stability.

The inventive sodium percarbonate particles preferably have a mean particle size in the range from 0.2 to 5 mm and more preferably in the range from 0.5 to 2 mm. Preference is given to sodium percarbonate particles having a low fines fraction, preferably having a fraction of less than 10% by weight of particles smaller than 0.2 mm and more preferably less than 10% by weight of particles having a particle size of less than 0.3 mm.

The inventive sodium percarbonate particles preferably have an essentially spherical shape with a smooth surface. Particles with a smooth surface have a surface roughness of less than 10% of the particle diameter and preferably of less than 5% of the particle diameter.

An appropriate selection of the particle size and particle form allows the storage stability of the inventive sodium percarbonate particles in detergent and cleaning composition formulations to be improved further.

The inventive coated sodium percarbonate particles can advantageously be used as a bleaching constituent in detergents and cleaning compositions. Detergents in the context of the invention are all formulations which are suitable for cleaning textiles in an aqueous wash liquor. Cleaning compositions in the context of the invention are all formulations which, in interaction with water, are suitable for cleaning surfaces which absorb only a small amount of water, if any. A form of cleaning compositions preferred in the context of the invention is that of machine dishwasher detergents which are suitable for machine cleaning of dishware and cutlery.

The invention further provides detergents and cleaning compositions which comprise sodium percarbonate particles coated in accordance with the invention. The inventive detergents and cleaning compositions comprise the inventive coated sodium percarbonate particles preferably in an amount of from 1 to 40% by weight based on the total amount of detergent or cleaning composition.

The inventive detergents and cleaning compositions may be in solid form and may then also comprise further components in the form of powder or in the form of granules beside the inventive coated sodium percarbonate particles. Furthermore, they may also comprise press-shaped bodies, in which case the inventive coated sodium percarbonate particles may be part of the press-shaped bodies. Such press-shaped bodies in the form of extrudates, pellets, briquets or tablets can be produced by processes for pressing agglomeration, especially by extrusion, strand pressing, perforation pressing, roller compaction or tabletting. For the performance of the pressing agglomeration, the inventive detergents or cleaning compositions may additionally comprise a binder which imparts a higher strength to the shaped bodies in the course of pressing agglomeration. However, for inventive detergents and cleaning compositions comprising press-shaped bodies preference is given to not using any additional binder and one of the wash-active constituents, for example a nonionic surfactant, fulfills the function of the binder.

The inventive detergents and cleaning compositions may additionally also be in liquid form or gel form and comprise the inventive coated sodium percarbonate particles dispersed in a liquid phase, or a gel phase. In addition to the inventive coated sodium percarbonate particles, further particles may be dispersed in the liquid phase, or the gel phase. The rheological properties of the liquid phase, or of the gel phase are preferably adjusted such that the particles dispersed therein remain suspended and do not settle during storage. The composition of a liquid phase is preferably selected in such a way that it has thixotropic or pseudoplastic flow properties. To establish such flow properties, suspension auxiliaries, such as swelling clays, especially montmorillonites, precipitated and fumed silicas, vegetable gums, especially xanthans, and polymeric gelling agents, such as vinyl polymers containing carboxyl groups, may be added.

Inventive detergents and cleaning compositions in liquid form or gel form preferably comprise inventive coated sodium percarbonate particles with an additional coating layer which, as the main constituent, comprises an alkali metal silicate having an $SiO_2$ to alkali metal oxide modulus of more than 2.5 In this embodiment, the detergents and cleaning compositions may comprise up to 15% by weight of water without there being any partial dissolution of the coated sodium percarbonate particles and a resulting release of hydrogen peroxide into the liquid phase or gel phase during storage.

The inventive detergents and cleaning compositions may, as well as the inventive coated sodium percarbonate particles, comprise, as further components, for example, also surfactants, builders, alkaline components, bleach activators, enzymes, chelating complexing agents, graying inhibitors, foam inhibitors, optical brighteners, fragrances and dyes.

Suitable surfactants for the inventive detergents and cleaning compositions are in particular anionic, nonionic and cationic surfactants.

Suitable anionic surfactants are, for example, surfactants with sulfonate groups, preferably alkylbenzenesulfonates, alkanesulfonates, alpha-olefinsulfonates, alpha-sulfo fatty acid esters or sulfosuccinates. In the case of alkylbenzenesulfonates, preference is given to those having a straight-chain or branched alkyl group having from 8 to 20 carbon atoms, especially having from 10 to 16 carbon atoms. Preferred alkanesulfonates are those with straight alkyl chains having from 12 to 18 carbon atoms. In the case of alpha-olefinsulfonates, preference is given to the reaction products of the sulfonation of alpha-olefins having from 12 to 18 carbon atoms. In the case of the alpha-sulfo fatty acid esters, preference is given to sulfonation products of fatty acid esters formed from fatty acids having from 12 to 18 carbon atoms and short-chain alcohols having from 1 to 3 carbon atoms. Suitable anionic surfactants also include surfactants having a sulfate group in the molecule, preferably alkyl sulfates and ether sulfates. Preferred alkyl sulfates are those with straight-chain alkyl radicals having from 12 to 18 carbon atoms. Also suitable are beta-branched alkyl sulfates and alkyl sulfates mono- or poly-alkyl-substituted in the middle of the longest alkyl chain. Preferred ether sulfates are the alkyl ether sulfates which are obtained by ethoxylating linear alcohols having from 12 to 18 carbon atoms with from 2 to 6 ethylene oxide units and then sulfating. The anionic surfactants used may finally also be soaps, for example alkali metal salts of lauric acid, myristic acid, palmitic acid, stearic acid and/or natural fatty acid mixtures, for example coconut, palm kernel or tallow fatty acids.

Suitable nonionic surfactants are, for example, alkoxylated compounds, especially ethoxylated and propoxylated compounds. Particularly suitable nonionic surfactants are condensation products of alkylphenols or fatty alcohols with from 1 to 50 mol, preferably from 1 to 10 mol, of ethylene oxide and/or propylene oxide. Likewise suitable are polyhydroxy fatty acid amides in which an organic radical having one or more hydroxyl groups which may also be alkoxylated is bonded to the amide nitrogen. Likewise suitable as nonionic surfactants are alkylglycosides with a straight-chain or branched alkyl group having from 8 to 22 carbon atoms, especially having from 12 to 18 carbon atoms, and a mono- or diglycoside radical, which is preferably derived from glucose.

Suitable cationic surfactants are, for example, mono- and dialkoxylated quaternary amines having a $C_6$- to $C_{18}$-alkyl radical bonded to the nitrogen and one or two hydroxyalkyl groups.

The inventive detergents and cleaning compositions further comprise builders which are capable of binding calcium and magnesium ions dissolved in water in the course of use. Suitable builders are alkali metal phosphates and alkali metal polyphosphates, especially pentasodium triphosphate; water-soluble and water-insoluble sodium silicates, especially sheet silicates of the formula $Na_5Si_2O_5$; zeolites of the A, X and/or P structures; and trisodium citrate. In addition to the builders, it is also possible to use organic cobuilders, for example polyacrylic acid, polyaspartic acid and/or acrylic acid copolymers with methacrylic acid, acrolein or vinyl monomers containing sulfonic acid, and the alkali metal salts thereof.

The inventive detergents and cleaning compositions generally also comprise alkaline components which upon the intended use bring about a pH in the range from 8 to 12 in the wash liquor, or the aqueous cleaning composition solution. Suitable alkaline components are in particular sodium carbonate, sodium sesquicarbonate, sodium metasilicate and other soluble alkali metal silicates.

Suitable bleach activators for the inventive detergents and cleaning compositions are in particular compounds having one or more perhydrolyzable acyl groups bonded to nitrogen or to oxygen, which react with the hydrogen peroxide released from the sodium percarbonate particles in the wash liquor, or the aqueous cleaning composition solution, to give peroxycarboxylic acids. Examples of such compounds are polyacylated alkylenediamines, especially tetraacetylethylenediamine (TAED); acylated triazine derivatives, especially 1,5-diacetyl-2,4-dioxohexahydro-1,3,5-triazine (DADHT); acylated glycolurils, especially tetraacetylglycoluril (TAGU); N-acylimides, especially N-nonanoylsuccinimide (NOSI); acylated phenolsulfonates, especially n-nonanoyl- or isononanoyloxybenzenesulfonate (n- or iso-NOBS); carboxylic anhydrides such as phthalic anhydride; acylated polyhydric alcohols such as ethylene glycol diacetate, 2,5-diacetoxy-2,5-dihydrofuran, acetylated sorbitol and mannitol, and acylated sugars such as pentaacetylglucose; enol esters; and N-acylated lactams, especially N-acylcaprolactams and N-acylvalerolactams. Likewise suitable as bleach activators are amino-functionalized nitriles and salts thereof (nitrile quats), which are known, for example, from the journal Tenside Surf. Det. 1997, 34(6), pages 404-409. The bleach activators used may also be transition metal complexes which can activate hydrogen peroxide for bleaching stain removal. Suitable transition metal complexes are, for example, known from EP-A 0 544 490 page 2 line 4 to page 3 line 57; WO 00/52124 page 5 line 9 to page 8 line 7 and page 8 line 19 to page 11, line 14; WO 04/039932 page 2 line 25 to page 10 line 21; WO 00/12808 page 6 line 29 to page 33 line 29; WO 00/60043 page 6 line 9 to page 17 line 22; WO 00/27975 page 2 lines 1 to 18 and page 3 line 7 to page 4 line 6; WO 01/05925 page 1 line 28 to page 3 line 14; WO 99/64156 page 2 line 25 to page 9 line 18; and GB-A 2 309 976 page 3 line 1 to page 8 line 32.

The inventive detergents and cleaning compositions may further comprise enzymes which enhance the cleaning action, especially lipases, cutinases, amylases, neutral and alkaline proteases, esterases, cellulases, pectinases, lactases and/or peroxidases. The enzymes may be adsorbed on carrier substances or be embedded into coating substances in order to protect them from decomposition.

The inventive detergents and cleaning compositions may also comprise chelating complexing agents for transition metals, with which a catalytic decomposition of active oxygen compounds in the wash liquor, or the aqueous cleaning composition solution, can be prevented. Suitable examples are phosphonates, such as hydroxyethane-1,1-disphosphonate, nitrilotrimethylenephosphonate, diethylenetriaminepenta(methylenephosphonate), ethylenediaminetetra(methylenephosphonate), hexamethylenediaminetetra (methylenephosphonate) and the alkali metal salts thereof. Likewise suitable are nitrilotriacetic acid and polyaminocarboxylic acids, especially ethylenediaminetetraacetic acid, diethylenetriaminopentaacetic acid, ethylenediamine-N,N'- disuccinic acid, methylglycinediacetic acid and polyaspartates, and the alkali metal and ammonium salts thereof. Finally, polybasic carboxylic acids and especially hydroxycarboxylic acids, especially tartaric acid and citric acid, are also suitable as chelating complexing agents.

The inventive detergents may additionally comprise graying inhibitors which keep soil detached from the fiber suspended and prevent reattachment of the soil to the fiber. Suitable graying inhibitors are, for example, cellulose ethers such as carboxymethylcellulose and the alkali metal salts thereof, methylcellulose, hydroxyethylcellulose and hydroxypropylcellulose. Polyvinylpyrrolidone is likewise suitable.

The inventive detergents and cleaning compositions may further also comprise foam inhibitors which reduce foam formation in the wash liquor. Suitable foam inhibitors are, for example, organopolysiloxanes such as polydimethylsiloxane, paraffins and/or waxes, and mixtures thereof with fine silicas.

The inventive detergents may optionally comprise optical brighteners which attach to the fiber, absorb light in the UV range and fluoresce in a blue color in order to compensate for yellowing of the fiber. Suitable optical brighteners are, for example, derivatives of diaminostilbenedisulfonic acid, such as alkali metal salts of 4,4'-bis(2-anilino-4-morpholino-1,3,5-triazinyl-6-amino)stilbene-2,2'-disulfonic acid, or substituted diphenylstyryls, such as alkali metal salts of 4,4'-bis(2-sulfostyryl)diphenyl.

The inventive detergents and cleaning compositions may finally also comprise fragrances and dyes.

Inventive detergents and cleaning compositions in liquid form or gel form may additionally also comprise up to 30% by weight of organic solvent, for example methanol, ethanol, n-propanol, isopropanol, n-butanol, ethylene glycol, 1,2-propylene glycol, 1,3-propylene glycol, 1,4-butylene glycol, glycerol, diethylene glycol, ethylene glycol methyl ether, ethanolamine, diethanolamine and/or triethanolamine.

As compared with detergents and cleaning compositions which do not comprise sodium percarbonate particles coated in accordance with the invention, the inventive detergents and cleaning compositions exhibit a better storage stability with lower losses of active oxygen content in the course of storage under moist conditions.

One embodiment of the inventive cleaning compositions is that of machine dishwasher detergents, preferably in the form of tablets, in which case the dishwasher detergents may also comprise a silver anticorrosive beside the inventive coated sodium percarbonate particles. Silver anticorrosives are agents which reduce or prevent the tarnishing of nonferrous metals, especially of silver, during machine cleaning with the machine dishwasher detergent. Suitable silver anticorrosives are compounds from the group of the triazoles, benzotriazoles, bisbenzotriazoles, aminotriazole and alkylaminotriazoles. The compounds of the substance classes mentioned may also have substituents, for example linear or branched alkyl groups having from 1 to 20 carbon atoms, as well as vinyl, hydroxyl, thiol or halogen radicals. In the case of bisbenzotriazoles, preference is given to compounds in which the two benzotriazole groups are each bonded in the 6 position via an X group, where X may be a bond, a straight-chain alkylene group which is optionally substituted by one or more $C_1$- to $C_4$-alkyl groups and has preferably from 1 to 6 carbon atoms, a cycloalkyl radical having at least 5 carbon atoms, a carbonyl group, a sulfonyl group, an oxygen atom or a sulfur atom. A particularly preferred silver anticorrosive is tolyltriazole.

EXAMPLES

Preparation of Coated Sodium Percarbonate Particles

To produce the coated sodium percarbonate particles, sodium percarbonate particles were used which had been prepared by the process described in EP-B 0 716 640 by fluidized bed buildup granulation from aqueous hydrogen peroxide solution and aqueous sodium carbonate solution and had a mean particle diameter $x_{50}$ of 0.78 mm and a fines fraction of smaller than 0.2 mm of less than 2% by weight. The coating layer was applied to these particles by the process described in EP-B 0 863 842 in paragraph [0021] by spraying on a 20% by weight aqueous solution of the coating substances in a fluidized bed at a fluidized bed temperature of from 55 to 60° C. and simultaneously evaporating water. The amounts of coating substance reported in percent by weight in table 1 are based on the total amount of coating substances sprayed on, calculated without water of crystallization, relative to the total amount of sodium percarbonate particles and coating substances used.

TABLE 1

Composition of the coated sodium percarbonate particles

| Example | Amount of coating [% by wt.] | Composition of the coating layer [parts by weight] |
|---|---|---|
| 1* | 6 | $Na_2SO_4$ 100 |
| 2 | 6 | $Na_2SO_4/NaBO_2$ 90:10 |
| 3 | 8 | $Na_2SO_4/NaBO_2$ 95:5 |

*Noninventive

Phase Analysis of the Coating Layer

The samples examined were shaped by pressing with a pressure of 40 kN to cylindrical pressings on whose surface the material of the coating layer is enriched as a result of the pressing operation. The phases present in the coating layer were determined by powder X-ray diffractometry with synchrotron radiation of wavelength 95.937 pm with grazing beam incidence at angles of incidence of 0.2, 0.5, 1 and 2°. In the diffractograms, the relative intensity of the reflections which originate from the phases present in the coating layer increases with decreasing angle of incidence. The phases detected in the coating layer by this process are listed in table 2.

TABLE 2

Phase composition of the coating layer

| Example | Phases | ICDD data set number |
|---|---|---|
| 1* | $Na_2SO_4$ (V) (main phase) | 00-037-1465 |
|  | burkeite (main phase) | 01-085-1731 |
| 2 | $NA_6(SO_4)_2(CO_3)$ (main phase) | 00-024-1139 |
|  | $Na_2SO_4$ (III) (main phase) | 00-024-1132 |
|  | burkeite (secondary phase) | 01-085-1731 |
|  | $Na_2SO_4$ (V) (traces) | 00-037-1465 |

Quantitative Phase Analysis of the Sodium Percarbonate Particles

For the sample from example 3, the phase composition was quantified by Rietveld analysis. To this end, 1.942 g of sample were mixed with 0.4513 g of corundum (NIST SRM No. 676) and ground, and a powder diffractogram in θ/2θ geometry was measured with synchrotron radiation of wavelength 116.425 pm.

TABLE 3

Phase composition of the sample from example 3

| Phase | ICDD data set number | Proportion [% by wt.] |
|---|---|---|
| sodium percarbonate | 01-083-1989 | 87.6 |
| $Na_2SO_4$ (III) | 00-024-1132 | 4.5 |
| burkeite | 01-085-1731 | 2.7 |
| $Na_2SO_4$ (V) | 00-037-1465 | 1.6 |
| trona | 00-029-1447 | 0.1 |
| amorphous |  | 3.5 |

Storage Stability in Washing Powder

To determine the storage stability in washing powder, 405 g of zeolite-containing heavy-duty powder detergent IEC-A* BASE (wfk-Testgewebe GmbH, Krefeld) were mixed with 15 g of TAED and 80 g of sodium percarbonate in a tumbling mixer for at least 10 min. The mixture was filled into an E2 detergent package (dimensions 19×14×4.5 cm) having a water-repellent impregnation, which was sealed with hotmelt adhesive. The detergent package was then stored in a climate-controlled cabinet at 35° C. and 80% relative air humidity. After the detergent package had been cooled to room temperature outside the climate-controlled cabinet, the contents of the detergent package were divided by means of a sample divider into samples of 12 g each. The active oxygen content before and after storage was determined by permanganometry in a customary manner. The active oxygen content before the storage and the active oxygen content after 8 weeks of storage were used to determine the retention of the active oxygen content (Oa retention) in percent as a measure of the storage stability in washing powder.

TABLE 4

Storage stability of coated sodium percarbonate particles in washing powder

| Example | Storage stability [Oa retention in percent] |
|---|---|
| 1* | 58 |
| 2 | 86 |
| 3 | 90 |

*noninventive

The invention claimed is:

1. Sodium percarbonate particles comprising a coating layer, wherein said coating layer comprises sodium sulphate in the form of a high-temperature phase of sodium sulphate (III) and/or of a high-temperature phase of a double salt of the composition $Na_4(SO_4)_{1+n}(CO_3)_{1-n}$ where n is 0 to 0.5.

2. The sodium percarbonate particles of claim 1, wherein the coating layer comprises sodium sulphate in the form of a phase of the double salt with hexagonal crystal structure.

3. The sodium percarbonate particles of claim 1, wherein the coating layer comprises more than 50% by weight of sodium sulphate.

4. The sodium percarbonate particles of claim 1, wherein the coating layer comprises a sodium borate.

5. The sodium percarbonate particles of claim 1, wherein the coating layer comprises 0.5 to 20% by weight of sodium borate, calculated as $NaBO_2$.

6. The sodium percarbonate particles of claim 1, wherein
a) the coating layer comprises sodium sulphate in the form of a sodium sulphate(III) phase;
b) the coating layer comprises more than 50% by weight of sodium sulphate.

7. Detergent comprising the sodium percarbonate particles of claim 1.

8. The detergent of claim 7, wherein the coating layer of said sodium percarbonate particles comprises sodium sulphate in the form of a sodium sulphate(III) phase.

9. The detergent of claim 7, wherein the coating layer of said sodium percarbonate particles comprises sodium sulphate in the form of a phase of the double salt with hexagonal crystal structure.

10. The detergent of claim 7, wherein the coating layer of said sodium percarbonate particles comprises more than 50% by weight of sodium sulphate.

11. The detergent of claim 7, wherein the coating layer of said sodium percarbonate particles comprises a sodium borate.

12. The detergent of claim 11, wherein the coating layer of said sodium percarbonate particles comprises 0.5 to 20% by weight of sodium borate, calculated as $NaBO_2$.

13. The detergent of claim 7, wherein
a) the coating layer of said sodium percarbonate particles comprises sodium sulphate in the form of a sodium sulphate(III) phase;
b) the coating layer of said sodium percarbonate particles comprises more than 50% by weight of sodium sulphate.

14. Cleaning composition comprising the sodium percarbonate particles of claim 1.

15. The cleaning composition of claim 14, wherein the coating layer of said sodium percarbonate particles comprises sodium sulphate in the form of a sodium sulphate(III) phase.

16. The cleaning composition of claim 14, wherein the coating layer of said sodium percarbonate particles comprises sodium sulphate in the form of a phase of the double salt with hexagonal crystal structure.

17. The cleaning composition of claim 14, wherein the coating layer of said sodium percarbonate particles comprises more than 50% by weight of sodium sulphate.

18. The cleaning composition of claim 14, wherein the coating layer of said sodium percarbonate particles comprises a sodium borate.

19. The cleaning composition of claim 18, wherein the coating layer of said sodium percarbonate particles comprises 0.5 to 20% by weight of sodium borate, calculated as $NaBO_2$.

* * * * *